3,359,230
PROCESS FOR THE MASS COLORATION OF POLYESTERS

Francis Bowman, Albert Charles Cooper, Francis Irving and Alistair Livingston, Manchester, England, assignors to Imperial Chemical Industries Limited, London, England, a corporation of Great Britain
No Drawing. Filed Apr. 25, 1966, Ser. No. 544,708
Claims priority, application Great Britain, May 19, 1965, 21,223/65; Feb. 11, 1966, 6,131/66
4 Claims. (Cl. 260—40)

This invention relates to a coloration process and more particularly to a process for the mass coloration of synthetic linear polyesters, particularly polyethylene terephthalate.

In order for a colouring matter to be completely satisfactory for use in the mass coloration of synthetic linear polyesters it must fulfil the following requirements:

(1) It must be capable of withstanding the high temperature of the molten material (290° C.).

(2) It must not have a high volatility, otherwise it may sublime during the spinning process, causing irregular coloration, and fabrics subsequently subjected to pleating operations may lose colour strength or cause marking of adjacent fabric.

(3) It must have high fastness to light, and to the action of dry-cleaning solvents, perspiration and bleaches.

It has now been found that a class of anthraquinone dyestuff compounds is particularly valuable for the mass coloration of synthetic linear polyesters.

According to the invention there is provided a process for the mass coloration of synthetic linear polyesters which comprises using as colouring matter one or more anthraquinone dyestuffs of the formula:

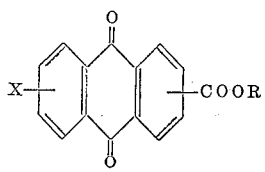

wherein X represents a hydrogen atom or a —COOR group, R represents a hydrogen atom or an alkyl, hydroxyalkyl, alkoxyalkyl or hydroxyalkoxyalkyl radical, and the anthraquinone nucleus is substituted by at least one hydroxy, amino, alkylamino, arylamino, alkylmercapto or arylmercapto group, and is optionally substituted by chlorine or bromine atoms or nitro or cyano groups.

The alkyl radicals which may be present in the said alkylamino and alkylmercapto groups are preferably lower alkyl radicals such as methyl, ethyl, propyl and butyl radicals; and as specific examples of the said groups there may be mentioned methylamino, ethylamino, propylamino, methylmercapto and ethylmercapto groups.

Throughout the specification the terms "lower alkyl" and "lower alkoxy" are used to denote alkyl and alkoxy radicals respectively containing from 1 to 4 carbon atoms.

As examples of aryl radicals which may be present in the said arylamino and arylmercapto groups there may be mentioned monocyclic aryl radicals such as the phenyl radical and lower alkyl derivatives thereof such as tolyl and n-butylphenyl radicals. If desired the said aryl radicals may contain substituents such as lower alkoxy radicals. As specific examples of the said groups there may be mentioned anilino, toluidino, methoxyanilino, butylanilino and phenylmercapto groups.

As examples of the alkyl radicals represented by R there may be mentioned lower alkyl radicals such as methyl, ethyl, propyl and butyl radicals. The hydroxyalkyl radicals represented by R are preferably hydroxy lower alkyl radicals such as $\beta$-hydroxyethyl, $\beta$- or $\gamma$-hydroxypropyl and $\beta$:$\gamma$-dihydroxypropyl radicals. The alkoxyalkyl radicals represented by R are preferably lower alkoxy lower alkyl radicals such as $\beta$-methoxyethyl, $\beta$-ethoxyethyl and $\beta$- or $\gamma$-ethoxypropyl radicals. The hydroxyalkoxyalkyl radicals represented by R are preferably hydroxy lower alkoxy lower alkyl radicals such as $\beta$-($\beta'$-hydroxyethoxy)ethyl and $\beta$-($\beta'$- or $\gamma'$-hydroxypropoxy)ethyl radicals.

The process of the invention can be conveniently carried out by incorporating one or more of the said dyestuffs into the synthetic linear polyesters by any of the known techniques for mass coloration of such materials. Thus the dyestuffs in finely divided form may be coated onto chips of the polyester by tumbling and the resulting coloured mixture subsequently melted and spun into filaments or shaped into solid objects. If desired, tumbling may be carried out with a dispersion of the dyestuff in a volatile liquid, e.g. water, or such a liquid may be used to moisten the mixture of dyestuff and polymer during the stage of tumbling. The volatile liquid is preferably removed by evaporation before melting. The dyestuff may also be incorporated with monomers and prepolymers at any convenient stage in the preparation of the polyester.

If desired the dyestuffs, wherein R represents a hydrogen atom, can be used in the form of salts, such as the ammonium salts, which give rise to the free acids during the polymerisation stage or during the heat treatment required to melt the polyester.

As examples of synthetic linear polyesters which can be coloured by the process of the invention there may be mentioned polyesters which are obtained by the reaction of terephthalic acid with glycols of the formula HO—$(CH_2)_x$—OH wherein $x$ is an integer of from 2 to 10, or with 1:4-di-(hydroxymethyl)cyclohexane. The term synthetic linear polyesters also includes copolyesters based on the said polyesters; such copolyesters being obtained by replacing a portion of the terephthalic acid by another dicarboxylic acid or by a hydroxycarboxylic acid, and/or replacing a portion of the glycol by a different glycol.

The colorations produced by the process of the invention have good fastness to washing, pressure, steaming, acid cross dyeing, perspiration, dry cleaning, rubbing after steaming, heat treatments such as are used in setting operations, and to light. It is also found that the colorations can be produced in heavy depths of shade, without impairing the properties of the synthetic linear polyesters or fibres derived therefrom.

The anthraquinone dyestuffs used in the process of the invention may be obtained by any of the methods known for producing substituted anthraquinone carboxylic acids or the corresponding esters. Thus for example, aminoanthraquinone carboxylic acids can be obtained by reduction of the corresponding nitro compounds. The esters can be obtained by reacting the corresponding carboxylic acids with thionyl chloride, and then reacting with the appropriate alcohol.

As specific examples of anthraquinone dyestuffs which can be used in the process of the invention there may be mentioned 1-anilinoanthraquinone-2-carboxylic acid
1-aminoanthraquinone-2-carboxylic acid
1-hydroxyanthraquinone-2-carboxylic acid
1-(p-butylanilino)anthraquinone-2-carboxylic acid
1-amino-4-hydroxyanthraquinone-2-carboxylic acid
1-amino-4-cyanoanthraquinone-2-carboxylic acid
1-bromo-2-aminoanthraquinone-3-carboxylic acid and the ethyl, $\beta$-hydroxyethyl and $\beta$-($\beta'$-hydroxyethoxy) ethyl esters of these acids.

The invention is illustrated but not limited by the following examples in which the parts are by weight.

Example 1

1 part of 1-anilinoanthraquinone-2-carboxylic acid in powder form is tumbled with 100 parts of polyethylene terephthalate in the form of chips. The resulting mixture is then melt spun in known manner to produce fibres of deep crimson colour and excellent fastness properties.

Example 2

1 part of 1-aminoanthraquinone-2-carboxylic acid, in finely divided form, 3 parts of β-ethoxyethanol and 100 parts of polyethylene terephthalate in the form of granules are mixed together until a uniform mixture is obtained. The mixture is then dried at 120° C. and melt-spun to yield uniformly coloured fibres of a bright orange shade which possess excellent fastness properties.

The following table gives further examples illustrating the process of the invention which may be carried out by methods similar to those described in Examples 1 and 2 above, but using the dyestuffs listed in the second column of the table. The third column of the table indicates the shades of the resulting polyester fibres.

| Example | Dyestuff | Shade |
| --- | --- | --- |
| 3 | 2-aminoanthraquinone-3-carboxylic acid | Golden yellow. |
| 4 | 1-hydroxyanthraquinone-2-carboxylic acid | Yellow. |
| 5 | 1-(p-butylanilino)anthraquinone-2-carboxylic acid. | Purple. |
| 6 | 1-bromo-2-aminoanthraquinone-3-carboxylic acid. | Yellow. |
| 7 | 1-amino-4-hydroxyanthraquinone-2-carboxylic acid. | Violet. |
| 8 | 1-amino-4-cyanoanthraquinone-2-carboxylic acid. | Orange. |
| 9 | 1-amino-4-ethylmercaptoanthraquinone-2-carboxylic acid. | Violet. |
| 10 | 1:4-diaminoanthraquinone-2-carboxylic acid. | Blue. |
| 11 | 1-aminoanthraquinone-4-carboxylic acid. | Tan. |
| 12 | β-(β'-hydroxyethoxy)ethyl 1-aminoanthraquinone-2-carboxylate. | Orange. |
| 13 | β-(β'-hydroxyethoxy)ethyl 1-isopropyl-aminoanthraquinone-2-carboxylate. | Red. |
| 14 | β-hydroxyethyl-1-(p-butylanilino)-anthraquinone-2-carboxylate. | Purple. |
| 15 | 1:5-diaminoanthraquinone-2:6-dicarboxylic acid. | Red. |
| 16 | 1:5-di(p-tolylthio)anthraquinone-2:6-dicarboxylic acid. | Yellow. |
| 17 | 1:5-di(p-methoxyanilino)anthraquinone-2:6-dicarboxylic acid. | Purple. |
| 18 | 1:5-di(p-n-butylanilino)anthraquinone-2:6-dicarboxylic acid. | Do. |
| 19 | 1:8-di(p-methoxyanilino)anthraquinone 2:7-carboxylic acid. | Violet. |
| 20 | β-methoxyethyl 1-(p-n-butylanilino)-anthraquinone-2-carboxylate. | Purple. |
| 21 | 1-amino-4-chloroanthraquinone-2-carboxylic acid. | Orange-red. |
| 22 | 1-amino-4-nitroanthraquinone-2-carboxylic acid. | Orange. |

The 1-(p-butylanilino)anthraquinone-2-carboxylic acid used in the above example was obtained by reacting 1-nitroanthraquinone-2-carboxylic acid with p-butylaniline. 1-amino-4-ethylmercaptoanthraquinone-2-carboxylic acid was obtained by reacting 1-amino-4-bromoanthraquinone-2-carboxylic acid with ethylmercaptan. The esters used in Examples 12 and 13 were obtained by the methods described in British specification No. 721,283.

The dyestuffs used in Examples 15 to 19 were obtained by reacting the appropriate dihalogenoanthraquinone dicarboxylic acid with the appropriate amine or mercaptan. The dyestuff used in Example 14 was obtained by reacting the sodium salt of 1-(p-butylanilino)anthraquinone-2-carboxylic acid with ethylene chlorohydrin.

Example 23

100 parts of dimethyl terephthalate, 71 parts of ethylene glycol and 0.05 part of manganese acetate are stirred together for 4 hours at 197° C. during which time about 33 parts of methanol distil off from the mixture. To this mixture is then added 0.04 part of phosphorous acid, 0.04 part of antimony trioxide and 3 parts of 1-anilino-anthraquinone-2-carboxylic acid which has previously been wetted out by ball milling for 30 minutes in the presence of 12 parts of ethylene glycol. The temperature of the mixture is then increased to 277° C. and the pressure is reduced to 0.3 mm. of mercury and the heating is continued under these conditions for a further 6 hours, whilst the excess ethylene glycol distils off. The melt is then formed into filaments which are subsequently drawn out into fibres. The fibres so obtained are coloured a deep crimson shade possessing excellent fastness properties.

In place of the 3 parts of 1-anilinoanthraquinone-2-carboxylic acid used in this example there are used 3.25 parts of ethyl 1-anilinoanthraquinone-2-carboxylate when a similar result is obtained.

Example 24

100 parts of dimethyl terephthalate, 71 parts of ethylene glycol, 0.05 part of manganese acetate and 3 parts of 1-anilinoanthraquinone-2-carboxylic acid are stirred together for 4 hours at 197° C. during which time about 33 parts of methanol distil off from the mixture. To this mixture is then added 0.04 part of phosphorous acid and 0.04 part of antimony trioxide, the temperature of the mixture is then increased to 277° C., and the pressure is reduced to 0.3 mm. of mercury, and the heating is continued under these conditions for a further 6 hours, whilst the excess ethylene glycol distils off. The melt is then formed into filaments which are subsequently drawn out into fibres. The fibres so obtained are coloured a deep crimson shade possessing excellent fastness properties.

We claim:

1. Process for the mass-coloration of synthetic linear polyesters which comprises using as colouring matter a dyestuff of the formula:

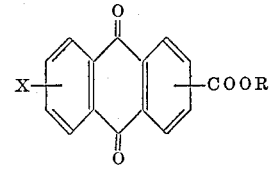

wherein X is selected from the class consisting of hydrogen and —COOR;

R is selected from the class consisting of hydrogen, lower alkyl, hydroxy lower alkyl, lower alkoxy lower alkyl and hydroxy lower alkoxy lower alkyl;

the anthraquinone nucleus is substituted by at least one substituent selected from the class consisting of amino, hydroxy, lower alkylamino, lower alkylmercapto, monocyclic arylamino and monocyclic aryl mercapto; and any further substituents on the anthraquinone nucleus are selected from the class consisting of chlorine, bromine, cyano and nitro wherein the dyestuff is mixed with the polyester and the resulting mixture is melted and spun into fibres.

2. Process for the mass coloration of synthetic linear polyesters which comprises using as coloring matter a dyestuff wherein said dyestuff is selected from the group consisting of 1-anilinoanthraquinone-2-carboxylic acid, 1-aminoanthraquinone-2-carboxylic acid, 1-hydroxyanthraquinone-2-carboxylic acid, 1-(p-butylanilino) anthraquinone-2-carboxylic acid, 1-amino-4-hydroxyanthraquinone-2-carboxylic acid, 1-amino-4-cyanoanthraquinone-2-carboxylic acid, 1-bromo-2-aminoanthraquinone-3-carboxylic acid, and the ethyl esters, β-hydroxyethyl esters and the β-(β'-hydroxyethoxy) ethyl esters thereof wherein the dyestuff is mixed with the polyester and the resulting mixture is melted and spun into fibres.

3. Process for the mass coloration of synthetic linear polyesters which comprises using as coloring matter a dyestuff of the formula:

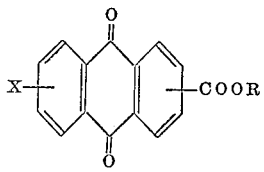

wherein X is selected from the class consisting of hydrogen and —COOR:
R is selected from the class consisting of hydrogen, lower alkyl, hydroxy lower alkyl, lower alkoxy lower alkyl and hydroxy lower alkoxy lower alkyl;
the anthraquinone nucleus is substituted by at least one substituent selected from the class consisting of amino, hydroxy, lower alkylamino, lower alkylmercapto, monocyclic arylamino and monocyclic aryl mercapto; and any further substituents on the anthraquinone nucleus are selected from the class consisting of chlorine, bromine, cyano and nitro wherein the dyestuff is mixed with polyester forming components which are then polymerized to form the polyester and the mixture is melted and spun into fibres.

4. Process for the mass coloration of synthetic linear polyesters which comprises using as coloring matter a dyestuff wherein said dyestuff is selected from the group consisting of 1-anilino-anthraquinone-2-carboxylic acid, 1-aminoanthraquinone-2-carboxylic acid, 1-hydroxyanthraquinone-2-carboxylic acid, 1-(p-butylanilino) anthraquinone-2-carboxylic acid, 1-amino-4-hydroxyanthraquinone-2-carboxylic acid, 1-amino-4-cyanoanthraquinone-2-carboxylic acid, 1-bromo-2-aminoanthraquinone-3-carboxylic acid, and the ethyl esters, $\beta$-hydroxyethyl esters and the $\beta$-($\beta'$hydroxyethoxy) ethyl esters thereof wherein the dyestuff is mixed with polyester forming components which are then polymerized to form the polyester and the mixture is melted and spun into fibres.

References Cited
UNITED STATES PATENTS
| | | | |
|---|---|---|---|
| 2,571,319 | 10/1951 | Waters | 260—40 |
| 3,104,233 | 9/1963 | Altermatt | 260—37 |
| 3,228,780 | 1/1966 | Grelat | 260—40 |

FOREIGN PATENTS
| | | |
|---|---|---|
| 889,814 | 2/1962 | Great Britain. |

JULIUS FROME, *Primary Examiner.*

A. HOLTZ, *Assistant Examiner.*